United States Patent
Boek et al.

(10) Patent No.: US 10,286,630 B2
(45) Date of Patent: May 14, 2019

(54) METHOD OF MANUFACTURING LAMINATED GLASS ARTICLES WITH IMPROVED EDGE CONDITION

(71) Applicant: CORNING INCORPORATED, Corning, NY (US)

(72) Inventors: Heather Debra Boek, Corning, NY (US); Thomas Michael Cleary, Elmira, NY (US); Michael Thomas Gallagher, Corning, NY (US); Paul John Shustack, Elmira, NY (US); Mark Owen Weller, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 252 days.

(21) Appl. No.: 14/898,017

(22) PCT Filed: Jun. 13, 2014

(86) PCT No.: PCT/US2014/042237
§ 371 (c)(1),
(2) Date: Dec. 11, 2015

(87) PCT Pub. No.: WO2014/201318
PCT Pub. Date: Dec. 18, 2014

(65) Prior Publication Data
US 2016/0152006 A1    Jun. 2, 2016

Related U.S. Application Data

(60) Provisional application No. 61/835,115, filed on Jun. 14, 2013.

(51) Int. Cl.
*C03C 15/00*    (2006.01)
*B32B 17/06*   (2006.01)
(Continued)

(52) U.S. Cl.
CPC ............. *B32B 17/06* (2013.01); *B32B 1/08* (2013.01); *B32B 3/08* (2013.01); *C03B 17/02* (2013.01);
(Continued)

(58) Field of Classification Search
CPC ....... C03B 17/02; C03B 17/064; C03B 17/06; C03B 29/025; C03B 23/0046; B32B 3/08
(Continued)

(56) References Cited

U.S. PATENT DOCUMENTS 1,829,647 A * 10/1931 Hackett ................ B32B 17/08
156/107
2,022,530 A   11/1935 White
(Continued)

FOREIGN PATENT DOCUMENTS

DE     19622566 C1    11/1997
EP      2448010 A2     5/2012
(Continued)

OTHER PUBLICATIONS

International Search Report and Written Opinion, dated Aug. 25, 2014, pp. 1-12, International Patent Application No. PCT/US2014/042237, European Patent Office, The Netherlands.

*Primary Examiner* — Binh X Tran
(74) *Attorney, Agent, or Firm* — Svetlana Z. Short

(57) ABSTRACT

A method of manufacturing a laminated glass article having a first clad layer, a second clad layer, and a core layer between the first clad layer and the second clad layer, by exposing an edge of the core layer. An etchant can be applied to the edge of the laminated glass article to form the recess. The recess can then be filled.

12 Claims, 3 Drawing Sheets

(51) Int. Cl.
*C03B 17/02* (2006.01)
*C03B 17/06* (2006.01)
*C03B 29/02* (2006.01)
*B32B 1/08* (2006.01)
*B32B 3/08* (2006.01)
*C03B 23/00* (2006.01)
*C03C 17/28* (2006.01)

(52) U.S. Cl.
CPC ........ *C03B 17/064* (2013.01); *C03B 23/0026* (2013.01); *C03B 29/025* (2013.01); *C03C 15/00* (2013.01); *C03C 17/28* (2013.01); *B32B 2250/03* (2013.01); *B32B 2255/26* (2013.01); *B32B 2419/00* (2013.01); *B32B 2509/00* (2013.01); *B32B 2605/00* (2013.01)

(58) Field of Classification Search
USPC .............................. 216/80, 97, 99
See application file for complete search history.

(56) References Cited

U.S. PATENT DOCUMENTS

| | | | |
|---|---|---|---|
| 2,592,620 A | 7/1971 | Carlisi et al. | |
| 3,592,620 A | 7/1971 | Carlisi et al. | |
| 3,737,294 A | 6/1973 | Dumbaugh et al. | |
| 3,746,526 A | 7/1973 | Giffon | |
| 3,849,097 A | 11/1974 | Giffen et al. | |
| 3,931,438 A | 1/1976 | Beall et al. | |
| 4,102,664 A | 7/1978 | Dumbaugh, Jr. | |
| 4,214,886 A | 7/1980 | Shay et al. | |
| 4,287,018 A * | 9/1981 | Gulati ............. | B24B 41/061 216/26 |
| 4,480,453 A | 11/1984 | Petkov et al. | |
| 4,828,598 A | 5/1989 | Imamura et al. | |
| 4,828,900 A | 5/1989 | Mouly | |
| 4,880,453 A | 11/1989 | Coppola et al. | |
| 5,034,354 A | 7/1991 | Fine | |
| 5,100,452 A | 3/1992 | Dumbaugh, Jr. | |
| 5,342,426 A | 8/1994 | Dumbaugh, Jr. | |
| 5,559,060 A | 9/1996 | Dumbaugh, Jr. et al. | |
| 5,637,363 A | 6/1997 | Leray et al. | |
| 6,344,259 B1 | 2/2002 | Tanaka et al. | |
| 7,201,965 B2 | 4/2007 | Gulati et al. | |
| 7,514,149 B2 | 4/2009 | Bocko et al. | |
| 7,713,631 B2 | 5/2010 | Yamada et al. | |
| 8,007,913 B2 | 8/2011 | Coppola et al. | |
| 8,110,279 B2 | 2/2012 | Shashidhar et al. | |
| 2004/0067343 A1 * | 4/2004 | Beteille ............. | B32B 17/10036 428/192 |
| 2008/0041833 A1 | 2/2008 | Cavallaro et al. | |
| 2008/0202167 A1 | 8/2008 | Cavallaro et al. | |
| 2010/0227949 A1 * | 9/2010 | Tamai ............... | C08F 299/00 523/400 |
| 2011/0303287 A1 * | 12/2011 | Lee ................. | B32B 17/10036 136/259 |
| 2012/0055094 A1 | 3/2012 | Iacovoni et al. | |
| 2014/0036338 A1 | 2/2014 | Bareman et al. | |
| 2014/0075996 A1 | 3/2014 | Dannoux et al. | |
| 2015/0030816 A1 | 1/2015 | Uemura et al. | |
| 2015/0368141 A1 * | 12/2015 | Bergman .......... | C03B 33/023 428/130 |
| 2016/0297705 A1 | 10/2016 | Demartino et al. | |

FOREIGN PATENT DOCUMENTS

| | | |
|---|---|---|
| GB | 1564627 | 4/1980 |
| WO | 1998014487 | 9/1997 |
| WO | 2009106883 A1 | 9/2009 |
| WO | 2010146389 A1 | 12/2010 |
| WO | 2014116788 A1 | 7/2014 |

* cited by examiner

METHOD OF MANUFACTURING LAMINATED GLASS ARTICLES WITH IMPROVED EDGE CONDITION

This application claims the benefit of priority under 35 U.S.C. § 371 of International Application No. PCT/US2014/042237, filed on Jun. 13, 2014, which claims the benefit of priority under 35 U.S.C. § 119 of U.S. Provisional Application Ser. No. 61/835,115, filed on Jun. 14, 2013, the content of each of which is relied upon and incorporated herein by reference in its entirety.

BACKGROUND

Field

The present specification generally relates to laminated glass articles and, more specifically, to laminated glass sheets or tubes having improved edges and methods for making laminated glass sheets or tubes having improved edges.

Technical Background

Glass sheets may be employed as automotive glazed glass or architectural glazed glass. Additionally, glass sheets, such as cover glasses, glass backplanes and the like, are employed in both consumer and commercial electronic devices such as LCD and LED displays, computer monitors, automated teller machines (ATMs) and the like. Some of these glass sheets may include "touch" functionality which necessitates that the glass sheet be contacted by various objects including a user's fingers and/or stylus devices and, as such, the glass must be sufficiently robust to endure regular contact without damage. Moreover, such glass sheets may also be incorporated in portable electronic devices, such as mobile telephones, personal media players, and tablet computers, automobiles, or buildings. The glass sheets incorporated in these apparatuses may be susceptible to damage during transport and/or use of the associated apparatus. Accordingly, glass sheets used in various apparatuses may require enhanced strength to be able to withstand not only routine "touch" contact from actual use, but also incidental contact and impacts which may occur when the device is being transported.

In laminated glass sheets, the surfaces of the sheet may be strengthened through compressive stresses created, for example, by a mismatch in coefficient of thermal expansion (CTE) between a core layer and clad layers of the laminated glass sheets. However, strengthening of the surfaces through compressive stress will generally create a high tensile stress in the core layer, which may be exposed when the glass sheet is cut. If the exposed glass core layer has a defect or is subjected to a damage event, failure or breakage of the glass sheet may occur.

Accordingly, a need exists for strengthening exposed edges of laminated glass sheets.

SUMMARY

In one aspect, a method of manufacturing a laminated glass article is disclosed. The method comprises forming a laminated glass article having a first clad layer, a second clad layer, a core layer between the first clad layer and the second clad layer, and an edge where the core layer is exposed. An etchant can be applied to the edge of the laminated glass article to form a recess in the edge of the laminated glass article by removing at least a portion of the core layer with the etchant. The recess is disposed between and can span between the first clad layer and the second clad layer, and is filled with a filler material.

In another aspect, a laminated glass article comprises a first clad layer, a second clad layer, a core layer between the first clad layer and the second clad layer, and an edge where the core layer is exposed. An etchant can be applied to the edge of the laminated glass article, and a recess can be formed in the edge of the laminated glass article by removing at least a portion of the core layer with the etchant. The recess is disposed between and can span between the first clad layer and the second clad layer, and it is filled with a protective polymer layer.

In another embodiment, a laminated glass article comprises a first clad layer, a second clad layer, a core layer between the first clad layer and the second clad layer, and an edge where the core layer is exposed. An etchant can be applied to the edge of the laminated glass article. A recess can be formed in the edge of the laminated glass article by removing at least a portion of the core layer with the etchant. The recess is disposed between and can span between the first clad layer and the second clad layer, and at least one of the first clad layer and the second clad layer are manipulated to fill the recess.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 4:
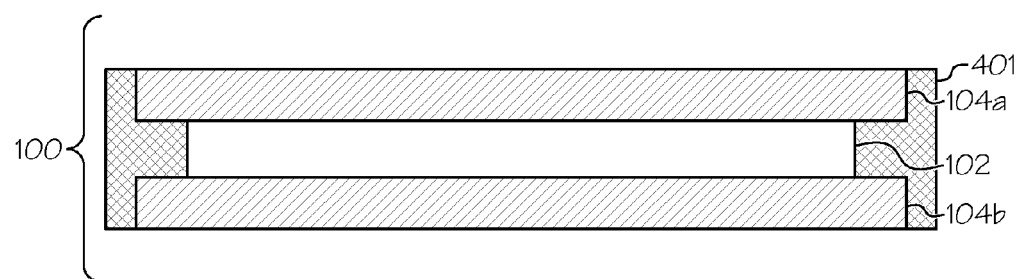
FIG. 4 schematically depicts a cross section of a laminated glass structure after etching with its recesses filled with a polymeric filler material.

Reference will now be made in detail to embodiments of laminated glass sheets having improved edge surfaces and methods for making the same. FIG. 4 schematically depicts a cross section of one embodiment of a laminated glass sheet. The laminated glass sheet generally comprises a glass core layer and at least one glass clad layer fused to the glass core layer. The laminated glass sheet also comprises at least one edge where the glass core layer is exposed when, for example, the laminated glass sheet is cut to a size and shape that is suitable for final use. A portion of the exposed glass core layer can be removed, and a filler material can be applied to the edge of the laminated glass sheet to cover the exposed portion of the glass core layer. Various embodiments of laminated glass sheets and methods for making laminated glass sheets will be described in more detail herein with specific reference to the appended drawings.

The term "CTE," as used herein, refers to the coefficient of thermal expansion of the glass composition averaged over a temperature range from about 20° C. to about 300° C.

The term "substantially free," when used to describe the absence of a particular component in a glass composition, means that the component is present in the glass composition as a contaminant in a trace amount of less than about 1 weight %, or in some cases less than about 0.5 weight %.

In embodiments of glass compositions described herein, the concentration of constituent components (e.g., $SiO_2$, $Al_2O_3$, $LiO_2$, and the like) are given in weight percent (wt %) on an oxide basis, unless otherwise specified.

As used herein, "filler material" refers to any material that can be filled into a recess formed by removing at least a portion of a core layer from a laminated glass sheet. In various embodiments, the filler material can be a polymeric material, a pre-polymeric material, glass fit or a portion of the clad layers or combinations thereof.

As used herein, "additive" refers to components that can be added to a polymeric or pre-polymeric material that may affect various characteristics of the polymeric or pre-polymeric material.

Laminated Glass Article

Figure 1:
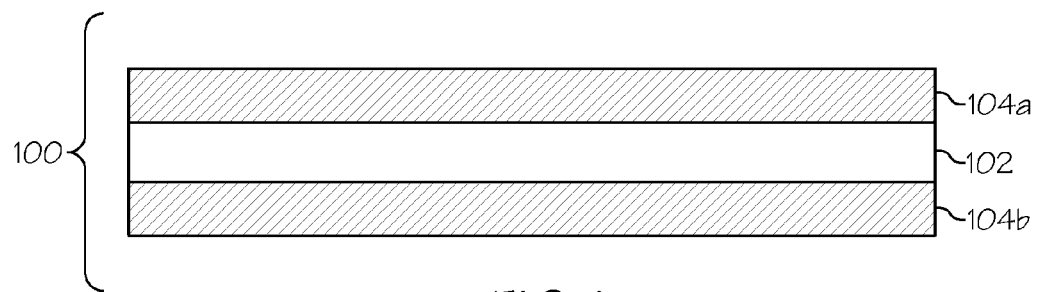
FIG. 1 schematically depicts a cross section of a laminated glass structure according to one or more embodiments shown and described herein.

Referring now to FIG. 1, a cross section of a laminated glass structure is schematically depicted. The laminated glass structure is representative of a laminated glass article such as, for example, a laminated glass sheet, a laminated glass tube, or another laminated glass article. The laminated glass article comprises the laminated glass structure shown in FIG. 1. For example, the laminated glass article comprises a laminated glass sheet 100 comprising the laminated glass structure. The laminated glass sheet 100 generally comprises a glass core layer 102 and at least one glass clad layer. In the embodiment depicted in FIG. 1, the laminated glass sheet comprises a pair of glass clad layers 104a, 104b. The glass core layer 102 generally comprises a first surface and an opposing second surface that is opposed to the first surface. In a set of embodiments, the glass clad layers 104a, 104b are fused to the glass core layer 102 without any additional materials, such as an adhesive, interlayer, coating layer or the like, disposed between the glass core layer 102 and the glass clad layers 104a, 104b.

In some embodiments, the laminated glass article comprises a laminated glass tube comprising the laminated glass structure shown in FIG. 1. For example, the laminated glass structure represents a partial longitudinal cross-section of the laminated glass tube. The laminated glass tube comprises a glass core layer and at least one glass clad layer. For example, the laminated glass tube comprises a pair of glass clad layers and a glass core layer disposed between the clad layers as described herein with reference to the laminated glass sheet 100. Each of the glass core layer and the glass clad layers comprises a tubular layer having a suitable transverse cross-sectional shape (e.g., circular, elliptical, triangular, rectangular, or another polygonal or non-polygonal shape). For example, in some embodiments, the laminated glass tube comprises a cylindrical tube, wherein the glass core layer and the glass clad layers comprise concentric cylindrical layers of the cylindrical tube. In some embodiments, the edges of the laminated glass tube (e.g., at one or both ends of the tube) are protected as described herein with reference to the laminated glass sheet 100.

In exemplary embodiments, the laminated glass sheet, which can include one or more clad layers and a glass core layer, can have a thickness of 4 mm or less, 2.5 mm or less, or even 2.0 mm or less. In other embodiments, the laminated glass sheet can have a thickness of about 1.5 mm or less, or even 1.0 mm or less. In embodiments, the laminated glass sheet can have a thickness of 0.2 mm or more, or even 0.3 mm or more. In other embodiments, the laminated glass sheet can have a thickness of 0.4 mm or more. The clad layers can be thin layers. In embodiments, each of the clad layers can have a thickness of less than 200 µm, or even less than 150 µm. In other embodiments, each of the clad layers can have a thickness of less than about 100 µm. In exemplary embodiments, each of the clad layers can have a thickness of 10 µm or more, or even 15 µm or more. In still other embodiments, each of the clad layers can have a thickness of 20 µm or more, or even 25 µm or more.

The laminated glass sheets 100 described herein can have improved strength over an individual sheet made of a similar material as a result of being laminated. For example, in some embodiments, the glass clad layers 104a, 104b are formed from a glass composition that has a lower average coefficient of thermal expansion (CTE) than the glass core layer 102. When glass clad layers formed from a glass composition having a relatively low average CTE are paired with a glass core layer formed from a glass composition having a higher average CTE during a lamination process, the difference in the CTEs of the glass core layer and the glass clad layers results in the formation of a compressive stress in the glass clad layers upon cooling. In some embodiments described herein, the glass clad layers are formed from glass compositions that have average CTEs less than or equal to about $95 \times 10^{-7}/°$ C. averaged over a range from 20° C. to 300° C. In some embodiments, the average CTE of the glass compositions can be less than or equal to about $65 \times 10^{-7}$ m/° C. averaged over a range from 20° C. to 300° C. In yet other embodiments, the average CTE of the glass compositions can be less than or equal to about $35 \times 10^{-7}/°$ C. averaged over a range from 20° C. to 300° C. However, in exemplary embodiments the average CTE of the clad layers can be any value that is less than the average CTE of the glass core layers with which they are paired.

The glass core layer 102 can be formed from a glass composition which has a high average CTE relative to the glass clad layers 104a, 104b to improve the strength of the laminated glass sheets. In some embodiments, the glass core layer can be formed from glass compositions which have an average coefficient of thermal expansion (CTE) which is greater than or equal to about $40 \times 10^{-7}/°$ C. in a range from 20° C. to 300° C. In some of these embodiments, the average CTE of the glass composition of the glass core layer can be greater than or equal to about $60 \times 10^{-7}/°$ C. in a range from 20° C. to 300° C. In yet other embodiments, the average CTE of the glass composition of the glass core layer can be greater than or equal to about $90 \times 10^{-7}/°$ C. averaged over a range from 20° C. to 300° C.

In embodiments where the CTE of the glass clad layers is lower than the CTE of the glass core layer, at least a portion of the glass core layer can be in tension (such as where the glass core layer has a region of central tension) as a result of the mismatched CTE values between the glass clad layers and the glass core layer. In embodiments where the glass core layer 102 is exposed at the edges of the glass sheet (for example, due to cutting of the laminated sheet), the central tension region of the glass sheet is exposed, which makes the glass sheet susceptible to failure or breakage from minor flaws or damage events that occur at the exposed edge of the glass sheet. Particularly, because of the increased tensile stress in the glass core layer 102, a shock from dropping the glass or some other form of force on the glass, can cause the glass to shatter. Accordingly, in embodiments described herein, the edge of glass sheets where the glass core layer is exposed is improved to prevent such failures.

A variety of processes can be used to form the laminated glass sheets described herein including, without limitation, the fusion lamination process, slot-draw lamination processes, and float glass processes, where lamination can take place simultaneously with melting and forming. Alternatively, lamination can be a separate process step after sheet formation.

Figure 2:
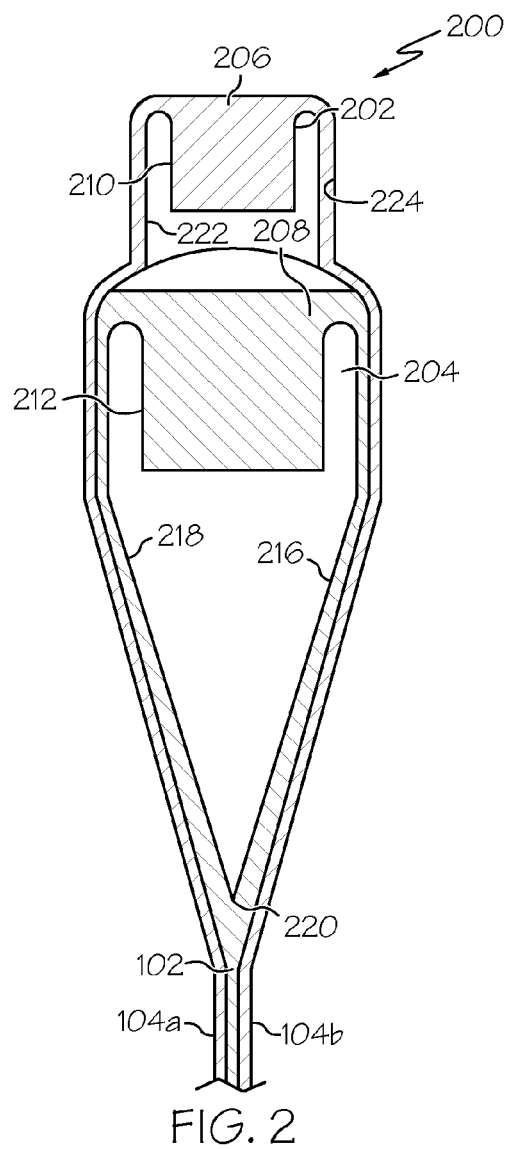
FIG. 2 schematically depicts a fusion draw process for making a laminated glass sheet according to one or more embodiments shown and described herein.

In particular embodiments, the laminated glass sheets 100 can be formed by the fusion lamination process as described in U.S. Pat. No. 4,214,886, which is incorporated herein by reference in its entirety. Referring to FIG. 2 by way of example, a laminate fusion draw apparatus 200 for forming a laminated glass sheet comprises an upper isopipe 202 that is positioned over a lower isopipe 204. The upper isopipe 202 comprises a trough 210 into which a molten glass clad composition 206 is fed from a melter (not shown). Similarly, the lower isopipe 204 comprises a trough 212 into which a molten glass core composition 208 is fed from a melter (not shown).

As the molten glass core composition 208 fills the trough 212, it overflows the trough 212 and flows over the outer forming surfaces 216, 218 of the lower isopipe 204. The outer forming surfaces 216, 218 of the lower isopipe 204 converge at a root 220. Accordingly, the molten glass core composition 208 flowing over the outer forming surfaces 216, 218 rejoins at the root 220 of the lower isopipe 204 thereby forming a glass core layer 102 of a laminated glass sheet.

Simultaneously, the molten glass clad composition 206 overflows the trough 210 formed in the upper isopipe 202 and flows over outer forming surfaces 222, 224 of the upper isopipe 202. The molten glass clad composition 206 is outwardly deflected by the upper isopipe 202 such that the molten glass clad composition 206 flows around the lower isopipe 204 and contacts the molten glass core composition 208 flowing over the outer forming surfaces 216, 218 of the lower isopipe, fusing to the molten glass core composition and forming glass clad layers 104a, 104b around the glass core layer 102.

As noted hereinabove, in some embodiments, the molten glass core composition 208 has an average coefficient of thermal expansion $CTE_{core}$ which is greater than the average coefficient of thermal expansion $CTE_{clad}$ of the molten glass clad composition 206. Accordingly, as the glass core layer 102 and the glass clad layers 104a, 104b cool, the difference in the average coefficients of thermal expansion of the glass core layer 102 and the glass clad layers 104a, 104b cause a compressive stresses to develop in the glass clad layers 104a, 104b. The compressive stress increases the strength of the resulting laminated glass sheet even without an ion-exchange treatment or thermal tempering treatment.

Once the glass clad layers 104a, 104b have been fused to the glass core layer 102 thereby forming a laminated glass sheet 100, the laminated glass sheets 100 can be cut to final dimensions by a suitable method. For example, the laminated glass sheet 100 can be cut by a laser or using "scribe and break" techniques. The cutting of the laminated glass sheet causes an edge of the glass sheet to be exposed such that the tensile zone within the glass core layer 102 is exposed on the edge and therefore is susceptible to damage.

According to embodiments, the edge of the glass sheets can be improved by covering at least part of, and in some embodiments the whole of, the exposed portion of the glass core layer 102 with a filler material such that the glass core layer 102 is no longer exposed along the edge of the glass sheet. Covering the exposed portion of the glass core layer protects the laminated glass sheet 100 from failure or breakage by reducing the probability that the glass core layer 102, which can have high tensile stresses, will be directly exposed to or subject to an impact or force. Although the exposed portion of the glass core layer can be covered with the filler material at any point after the glass core layer has been exposed, in some embodiments, a portion of the glass core layer can be removed from the laminated glass sheet before the exposed glass core layer is covered with the filler material.

Removing an exposed portion of the glass core layer creates a recess in the edge of the laminated glass sheet that is disposed between and can span between a first clad layer and a second clad layer. A portion of the glass core layer at the surface of the laminated glass sheet can be removed and filler material can then be applied into the recess to cover the portion of the glass core layer that was exposed. An exposed portion of the glass core layer can be removed by any suitable method. For example, an exposed portion of the glass core layer can be mechanically removed, such as by a machining, laser ablation, or the like. Alternatively or in addition an exposed portion of the glass core layer can be removed by chemical means, such as chemical etching, such as when the laminated glass sheet is particularly thin, for example, removing an exposed portion of the glass core layer by mechanical means can cause the laminated glass sheet to fracture, thereby creating unwanted product loss.

Chemical etching can be used to remove a portion of the glass core layer regardless of the thickness of the laminated glass sheet or the thickness of the clad layers relative to the thickness of the glass core layer. However, as stated above, in embodiments where any of the laminated glass sheet, clad layers, or glass core layer are thin, chemical etching can prevent fracturing of the laminated glass sheet (as opposed to mechanical removal which can result in fracture of one or more of the layers). In embodiments, the entire edge of the laminated glass sheet can be exposed to the etchant. Thus, the clad layers as well as the glass core layer can be exposed to the etchant, which can result in removing portions of the clad layers along with a portion of the glass core layer. Accordingly, if the clad layers are constructed of material that is as soluble as or more soluble in the etchant than the glass core layer, the recess between the clad layers referred to above will not be formed and, in the latter instance, a larger portion of the glass core layer can be exposed. Accordingly, in some embodiments suitable for forming a recess, the glass core layer can be at least 5 times more soluble in the etchant than the clad layers, or even at least 25 times more soluble in the etchant than the clad layers. In other embodiments, the glass core layer can be at least 50 times more soluble in the etchant than the clad layers, or even at least 75 times more soluble in the etchant than the clad layers. In still other embodiments, the glass core layer can be at least 100 times more soluble in the etchant than the clad layers. In some embodiments, the etchant etches the glass core layer at least 2 times faster than the clad layers, at least 5 times faster than the clad layers, at least 25 times faster than the clad layers, at least 50 times faster than the clad layers, at least 75 times faster than the clad layers, or at least 100 times faster than the clad layers. Thus, the etchant selectively etches the core layer preferentially to the clad layers.

The dissolution rate can be measured according to the following equation:

$$\frac{(W_i - W_f) \times 10{,}000 \ \mu m/cm}{\rho \times A_s} \Big/ t$$

where $W_i$ is the initial weight of the glass sheet in grams, $W_f$ is the final weight of the glass sheet in grams, $\rho$ is the density of the glass in g/cm$^3$, $A_s$ is the surface area of the glass exposed to the etchant in cm$^2$, and t is time in minutes.

While the glass core layer can be more soluble in the etchant than the clad layers, in some embodiments the glass core layer and the clad layers can also comprise materials that are amenable to the fusion draw method. Accordingly, in some embodiments, the components of the glass compositions for both the glass core layer and the glass clad layers can be balanced to provide glasses that are amenable to the fusion draw method and to provide a glass core layer that is more soluble in an etchant than the clad layers.

Glass Core Layer

In some embodiments of the laminated glass sheet 100 described herein, the glass composition from which the glass core layer 102 is formed has a liquidus viscosity and a liquidus temperature suitable for fusion formation. For example, a glass composition from which the glass core layer 102 can be formed has a liquidus viscosity that is greater than or equal to about 35 kPoise. In some embodiments, the liquidus viscosity of a glass composition from which the glass core layer 102 can be formed is greater than or equal to 100 kPoise or even greater than or equal to 200 kPoise. In some embodiments, the liquidus temperature of a glass composition from which the glass core layer can be formed is less than or equal to about 1400° C. In some embodiments, the liquidus temperature is less than or equal to 1350° C. or even less than or equal to 1300° C. In still other embodiments, the liquidus temperature is less than or equal to 1200° C., or even less than or equal to 1100° C.

In an exemplary core glass composition, SiO$_2$ is the largest constituent and, as such, SiO$_2$ is the primary constituent of the glass network formed from the glass composition. Pure SiO$_2$ has a relatively low CTE and is alkali free. However, pure SiO$_2$ has an extremely high melting point. Accordingly, if the concentration of SiO$_2$ in the glass composition is too high, the formability of the glass composition can be diminished as higher concentrations of SiO$_2$ increase the difficulty of melting the glass, which, in turn, adversely impacts the formability of the glass. In some embodiments, the glass composition comprises SiO$_2$ in a concentration of from about 40 wt % to about 60 wt %, or in some embodiments from about 45 wt % to about 55 wt %. In other embodiments, the glass composition comprises SiO$_2$ in a concentration of about 50 wt %.

The core glass layer compositions can further comprise Al$_2$O$_3$. Al$_2$O$_3$ can serve as a glass network former, similar to SiO$_2$. Al$_2$O$_3$ can increase the viscosity of the glass composition due to its tetrahedral coordination in a glass melt formed from a properly designed glass composition. However, when the concentration of Al$_2$O$_3$ is balanced against the concentration of SiO$_2$ and the concentration of alkali oxides in the glass composition, Al$_2$O$_3$ can reduce the liquidus temperature of the glass melt, thereby enhancing the liquidus viscosity and improving the compatibility of the glass composition with certain forming processes, such as the fusion forming process.

In some embodiments, Al$_2$O$_3$ can be present in a concentration of at least about 12 wt %, or in some embodiments at least about 20 wt %. In one set of embodiments, the Al$_2$O$_3$ content does not exceed about 35 wt % to achieve the desired glass viscosities for melting and forming. In some embodiments, the Al$_2$O$_3$ content is from about 15 wt % to about 35 wt %, and in some embodiments from about 17 wt % to about 30 wt %.

Na$_2$O is a component that can lower the viscosity of a glass to improve the meltability and the formability thereof. In some embodiments, Na$_2$O can be present in the core glass composition in a concentration of at least about 12 wt %. When the content of Na$_2$O is too large, the thermal expansion coefficient of the glass becomes too large, and the thermal shock resistance of the glass can be lowered. In some embodiments, the concentration of Na$_2$O in the core glass composition is less than about 25 wt %. In some embodiments, Na$_2$O is present in the core glass composition in a concentration of from about 15 wt % to about 20 wt %, and in some embodiments in a concentration of about 16 wt %.

B$_2$O$_3$ can be added to the core glass composition to decrease the viscosity and liquidus temperature of the glass. An increase in the concentration of B$_2$O$_3$ can lower the liquidus temperature of a glass composition by 18° C. to 22° C. per mol % of B$_2$O$_3$. As such, B$_2$O$_3$ decreases the liquidus temperature of the glass composition more rapidly than it decreases the liquidus viscosity of the glass composition. B$_2$O$_3$ can also be added to the glass composition to soften the glass network. In some embodiments, B$_2$O$_3$ can be present in the glass composition. In some embodiments, B$_2$O$_3$ is present in the glass composition in a concentration greater than or equal to about 4 wt %. For example, in some embodiments, B$_2$O$_3$ is present in the glass composition in a concentration greater than or equal to about 5 wt % and less than or equal to about 13 wt %. In some of these embodiments, the concentration of B$_2$O$_3$ in the glass composition is less than or equal to about 7 wt % or even less than or equal to about 6 wt %.

The core glass composition, in some embodiments, comprises other elements, such as other alkali metal oxides, for example K$_2$O and the like, in amounts ranging from about 0.1 to about 15 wt %. In some embodiments, the core glass also contains from about 0.1 to about 5 wt % of alkaline earth metal oxides, such as MgO, CaO, SrO, and BaO, and in some embodiments from about 0.1 to about 1 wt % of SnO$_2$ or Fe$_2$O$_3$.

In some embodiments, the composition of the glass core layer can be selected such that it is more soluble in an etchant, such as, for example, hydrofluoric acid, hydrochloric acid, phosphoric acid, sulfuric acid, or ammonium bifluoride, than one, or both, of the clad layers. In some embodiments, the glass core layer has an etching rate of from about 2.00 μm/min to about 5.00 μm/min, and in some embodiments from about 3.00 μm/min to about 4.00 μm/min. In some embodiments, the glass core layer has an etching rate of from about 3.25 μm/min to about 3.85 μm/min, and in some embodiments from about 3.30 μm/min to about 3.60 μm/min.

In some embodiments, the liquidus viscosity and liquidus temperature and etching rates can be attained with a glass core layer formed from a glass composition that comprises from about 40 wt % to about 55 wt % $SiO_2$; from about 25 wt % to about 30 wt % $Al_2O_3$; from about 12 wt % to about 20 wt % $Na_2O$; from about 0.1 wt % to about 1.0 wt % $K_2O$; from about 0 wt % to about 13 wt % $B_2O_3$; from about 0 wt % to about 0.5 wt % MgO; from about 0 wt % to about 0.5 wt % CaO; and from about 0 wt % to about 1 wt % $SnO_2$.

While reference has been made herein to a specific glass composition used for forming glass core layer 102, it should be understood that other glass compositions can be used to form glass core layer 102 of the laminated glass sheet 100 so long as the glass compositions are amenable to etching, and in some embodiments also amenable to fusion forming.

Glass Clad Layer

In some embodiments, the clad layers can be less soluble in the etchant than the glass core layer. Like the glass core layer, the clad layers can also be comprised of materials that are amenable to the fusion draw method. Accordingly, in some embodiments, the compositions of the glass clad layers can be balanced to provide glasses that are amenable to the fusion draw method and where the glass core layer is more soluble in the etchant than the clad layers. In embodiments that comprise more than one clad layer, the clad layers can have the same or different compositions. In some embodiments, the laminated glass sheet can include multiple clad layers (two or even greater than two clad layers) having different compositions (or at least one of the clad layers has a different composition than one or more other clad layers) where each of the clad layers are less soluble in an etchant than the glass core layer.

Referring again to FIG. 1, the glass clad layers 104a, 104b can be formed from a variety of different glass compositions so long as the composition of the glass clad layers 104a, 104b is capable of being fused to the glass core layer 102 and is less soluble in an etchant than the glass core layer 102. In some embodiments, the glass clad layers can comprise alkali metals and/or compounds containing alkali metals while, in other embodiments, the glass clad layers is free or substantially free from alkali metals and/or compounds containing alkali metals.

In some embodiments, $SiO_2$ is the largest constituent of the clad layer composition. In some embodiments, the clad layer composition comprises $SiO_2$ in a concentration of from about 50 wt % to about 75 wt %, and in some embodiments from about 55 wt % to about 70 wt %. In other embodiments, the clad layer composition comprises $SiO_2$ in a concentration of from about 58 wt % to about 65 wt %, and in some embodiments about 60 wt %.

The clad layer compositions can further comprise $Al_2O_3$. In some embodiments, $Al_2O_3$ is present in a concentration of at least about 7 wt %, or at least about 10 wt %. In some embodiments, the $Al_2O_3$ content does not exceed about 25 wt % to achieve the desired glass viscosities for melting and forming. In some embodiments, the $Al_2O_3$ content of the clad layers can be from about 12 wt % to about 20 wt %, or from about 15 wt % to about 17 wt %.

$Na_2O$ can be present in the clad layer compositions, and in some embodiments in a concentration of at least about 5 wt %. In some embodiments, the concentration of $Na_2O$ in the clad layer compositions is less than about 15 wt %. In some embodiments, $Na_2O$ is present in the clad layer compositions in a concentration of from about 7 wt % to about 13 wt %, and in some embodiments about 12 wt %. In some embodiments, $Na_2O$ is absent from the clad layer composition (or compositions).

$K_2O$ is a component that can have an effect of lowering high temperature viscosity to enhance the meltability and the formability. In some embodiments, the content of $K_2O$ in the clad layer composition is from about 0 to about 5 wt %. If the content of $K_2O$ is too large, the CTE of the glass can become large, and the thermal shock resistance of the glass can be lowered. In some embodiments, $K_2O$ is present in the clad layer composition in a concentration of 4% or less, or even 2 wt % or less; in other embodiments, $K_2O$ is absent from the clad layer composition (or compositions).

In some embodiments, the clad layer composition contains other elements, such as from about 0.1 to about 5 wt % of alkaline earth metal oxides, such as MgO, CaO, SrO, and BaO, and from about 0.1 to about 1 wt % of $SnO_2$ or $Fe_2O_3$. In other embodiments, the clad layer or layers are free of or substantially free of alkaline earth metal oxides. In other embodiments, the clad layer or layers are free of or substantially free of $SnO_2$ or $Fe_2O_3$, or both.

In some embodiments, the glass clad layers 104a, 104b are formed from glass compositions which contain alkali ions, such as $Li^+$, $Na^+$, and $K^+$. In these embodiments, the presence of the alkali ions can facilitate chemically strengthening the glass by ion exchange, thereby improving the strength of the laminated glass sheet.

In some embodiments, the glass clad layers 104a, 104b are formed from glass compositions that are free or substantially free of alkali ions, such as $Li^+$, $Na^+$, and $K^+$. In such embodiments, the surface of the glass can be placed in compression through a CTE mechanism, where the glass clad layers have a lower CTE than the glass core layer. In embodiments where the glass clad layers are free or substantially free of alkali ions, the laminated glass sheet can be implemented as an electronics substrate, such as a display glass or touch sensor substrate, where the electronic function of thin film layers deposited on the clad glass surfaces is enhanced or retained by a relatively alkali-free surface environment.

The composition of the clad layer can be selected such that the clad layer composition is less soluble in an etchant, such as, for example, hydrofluoric acid, hydrochloric acid, nitric acid, sulfuric acid, phosphoric acid, or ammonium bifluoride, than the glass core layer. In some embodiments, the clad layers have an etching rate of from about 0.10 μm/min to about 1.00 μm/min, and in some embodiments from about 0.20 μm/min to about 0.90 μm/min. In some other embodiments, the clad layers have an etching rate of from about 0.40 μm/min to about 0.50 μm/min.

In some embodiments, liquidus viscosity and liquidus temperature and etching rates can be attained with one or more glass clad layers formed from a glass composition that comprise from about 55 wt % to about 65 wt % $SiO_2$; from about 15 wt % to about 20 wt % $Al_2O_3$; from about 10 wt % to about 15 wt % $Na_2O$; from about 0.1 wt % to about 7 wt % $K_2O$; from about 0 wt % to about 2 wt % BaO; from about 0 wt % to about 5 wt % MgO; from about 0 wt % to about 1 wt % CaO; from about 0 wt % to about 5 wt % $B_2O_3$; and from about 0 wt % to about 1 wt % $SnO_2$.

While reference has been made herein to a specific glass composition used for forming glass clad layers 104a, 104b, other glass compositions can be used to form glass clad layers 104a, 104b of the laminated glass sheet 100 so long as the glass compositions are not readily amenable to etching, and in some embodiments are also amenable to formation by the fusion lamination process.

Etching the Laminated Glass Article

Any suitable etchant can be used to remove a portion of the glass core layer. Exemplary etchants include hydrofluoric acid, hydrochloric acid, ammonium bifluoride, and mixtures thereof. In some embodiments, the etchant is an acid solution comprising an acid such as, for example, HF or HF combined with a fluoride salt such as NaF, KF, or the like. In addition, other acids such as $H_2SO_4$, HCl, $H_3PO_4$, $HNO_3$, $CH_3COOH$, or the like can be added to the HF solution to enhance etch rate and solubility of etching by-products. In some embodiments, the edge of the laminated glass sheet can be etched using an alkali liquid solution. Such alkali solutions include, but are not limited to, KOH, $NH_4OH$, $NH_4HF_2$, TMAH (tetra methyl ammonium hydroxide), and the like. In some embodiments, the alkali etchant is heated up to a temperature in a range from about 25° C. to about 65° C. or from about 25° C. to about 50° C. to enhance the etch rate. The type of etchant can be selected based upon the composition of the glass core layer and the compositions of the clad layers. In some embodiments, the etchant is a mixture of hydrofluoric acid and hydrochloric acid mixed in a 1:1 ratio by volume. In some embodiments, the etchant is a mixture of hydrofluoric acid and hydrochloric acid mixed in a ratio by volume of 1:2 to 1:10.

The etchant can be applied to the edge of the laminated glass sheet by any suitable method. Exemplary methods for applying the etchant to the edge of the glass sheet can include dip coating, spray coating, roll coating or the like. In some embodiments, the etchant has the viscosity of a gel so that the etchant can be more selectively applied to the laminated glass sheet, for example, the etchant can be applied with precision over only the edge of the laminated glass sheet. The temperature of the etchant upon application to the laminated glass sheet can be selected according to the composition of the glass core layer, the composition of the clad layers, or the application method. In some embodiments, temperatures of the etchant are from about 25° C. to about 65° C. or from about 25° C. to about 50° C. The duration of the etchant application will depend on the etching rate of the etchant for the glass core layer and the clad layers and the desired depth of the recess.

Figure 3:
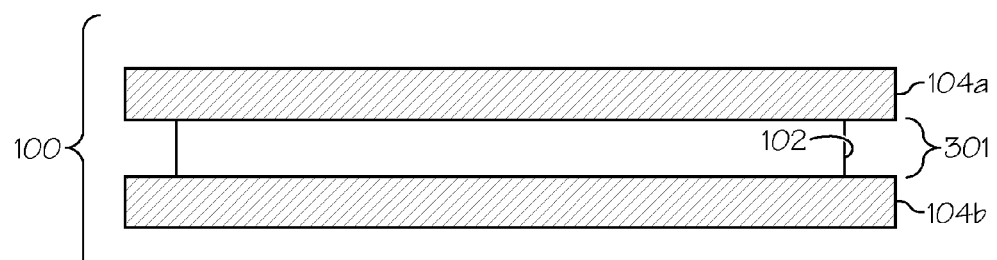
FIG. 3 schematically depicts a cross section of a laminated glass structure after etching.

FIG. 3 shows a schematic representation of one embodiment of a post-etch laminated glass sheet, Glass core layer 102 is positioned between two glass clad layers 104a, 104b. Recess 301 was created between clad layer 104a and clad layer 104b by removing a portion of the glass core layer 102, such as by the chemical etching methods disclosed herein. The recess can have any suitable depth as measured from the edge of the laminated glass sheet to the center of the laminated glass sheet. In some embodiments, the recess has a depth of about 5 µm to about 100 µm, or in some embodiments from about 15 µm to about 90 µm. In some embodiments, the recess has a depth of from about 25 µm to about 80 µm, or in some embodiments from about 35 µm to about 70 µm.

Removing a portion of the glass core layer 102 at the edge of the laminated glass sheet and then applying a filler material to the recess at the edge of the laminated glass sheet allows for complete enclosure of the glass core layer. For example, allowing a filler material to completely fill the recess 301 will provide complete coverage of the glass core layer, thereby protecting the high-tensile stress glass core layer from forces that can cause breakage of the laminated glass sheet. A filler material suitable for the end application of the glass sheet can be used to cover the edge of the glass sheet.

In some embodiments a mask layer can be applied to portions of the clad layer that are not to be etched. Any conventional mask material that prevents etching caused by the etchant can be used and can be applied by any conventional process.

Filling the Recess

FIG. 4 schematically depicts an embodiment where recess 301 is filled with a polymeric or pre-polymeric filler material 401. In embodiments as shown in FIG. 4, clad layers 104a, 104b need not be modified and the polymeric or pre-polymeric filler material 401 can be inserted into the recess 301 formed in the laminated glass sheet 100 between the clad layers 104a, 104b. Various types of polymeric or pre-polymeric coating materials can be used as a filler material to cover the edge of the laminated glass sheet. In some embodiments, the filler material is applied to the edge of the laminated glass sheet as a liquid and then dried to a solid. The liquid coating can be applied by any suitable method, such as dip coating, spray coating, jetting, dispensing, roll coating, brush or sponge application, etc. After the liquid filler material is applied to the edge of the laminated glass sheet in a desired amount, the filler material is dried by a suitable method. In some embodiments, the polymeric or pre-polymeric filler material is dried, for example, by cooling, evaporating a solvent from a polymeric system, or curing pre-polymeric materials.

Polymers that solidify upon cooling can be referred to as hot melt polymers. Hot melt polymers have the advantage of quickly converting from a liquid to a solid upon cooling and do not contain solvents or water that need to be evaporated for the polymer to solidify. However, hot melts can have relatively high viscosities even in their liquid state and cool so quickly that they can not flow into tight spaces to completely cover the exposed glass core layer. Further, many hot melt polymers have thermoplastic properties after they solidify, which can lead to softening if exposed to high temperatures. Exemplary hot melt polymers include, but are not limited to, polyvinyl acetate, polyethylene acrylate, polyamides, polyesters, polyethylene vinyl acetate, polyolefins, styrene block copolymers, and polyurethanes. Hot melt polymers can be applied by any suitable method at temperatures of, for example, greater than about 80° C., or even greater than about 100° C. Some exemplary hot melt polymers can be applied at temperatures of greater than about 150° C., or even greater than about 200° C. The hot melt polymers, which can be heated above their softening temperature, can be ejected from a nozzle into the recess. In other embodiments, the hot melt polymer can be heated well above its softening point and applied to the recess 301 by an applicator, such as a blade or knife. Other methods for applying the hot melt polymer to the recess can be utilized. Exemplary hot melt polymers quickly return to their solid state at temperatures below their application temperature, which can be the ambient temperature during application. Thus, hot melt polymers can provide a rigid protective layer without further solidifying or evaporating a solvent. However, hot melt polymers can soften upon exposure to elevated temperatures, which could result in a shift of the filler material 401 that could expose the glass core layer 102 at the edge of the laminated glass sheet 100.

In other embodiments, the filler material 401 can be applied to the edge of the laminated glass sheet as a polymer solution or emulsion. Polymer solutions or emulsions can have low viscosities, which can beneficially allow the polymer solution or emulsion to completely cover the exposed portion of the glass core layer. Thus, the polymer solution or emulsion can be applied to the edge of the laminated glass sheet by any suitable method, such as spray coating, dip coating, or dropping the polymer emulsion into the recess 301 of the laminated glass sheet 100.

The polymer emulsion can initially include water (or other solvent), polymer, and a surfactant, where the polymer is emulsified with the surfactant in a continuous phase of water. In embodiments, the surfactant can include fatty acids, sodium lauryl sulfates, and alpha olefin sulfonate. In some embodiments, water soluble polymers, such as hydroxyethyl cellulose or certain polyvinyl alcohols can be included in the initial mixture in addition to, or in place of, the surfactant. In some embodiments, the polymer present in the initial mixture can include a polymer formed from one or more of the following monomers: ethylene; vinyl chloride; propylene; vinyl acetate; acrylonitrile; styrene; vinyl alcohol; butadiene; isoprene; chloroprene; vinylidene fluoride; tetrafluoroethylene; isobutene; acrylics; polyesters; alkyds; epoxies; and mixtures thereof. The polymer emulsion can be applied to the recess 301 of the laminated glass sheet before it is polymerizing, while it is polymerizing, or after the polymerization has occurred, or some combination thereof. The water or solvent must be removed to allow the polymer to fill the recess 301 in the laminated glass sheet 100. Removing the water or solvent from the polymer emulsion can include heating the entire laminated glass sheet 100, such as in an oven or kiln, or can include local heating, for example only of the polymer emulsion or solution, such as by blow drying or focused radiant heating.

However, it can be difficult to completely fill the recess 301 with the formed polymer because the water or solvent in the polymer emulsion can comprise the majority of polymer emulsion system's volume. Thus, when the recess 301 is filled with the polymers emulsion and the water or solvent is subsequently removed, the polymer can only fill a portion of the recess. Accordingly, using a polymer emulsion or solution can require multiple applications of the polymer emulsion or solution to the recess, and can require multiple drying cycles, thereby adding length and cost to the formation of the laminated glass sheet with an improved edge.

In some embodiments, the filler material can be applied by a polymer coating system that comprises coating the edge of the laminated glass sheets with a liquid pre-polymeric material and then chemically reacting the pre-polymeric material to form a polymeric filler material coating. Although such polymer coating systems can include water or a solvent, the water or solvent can be present in minimal amounts. In certain embodiments, water or solvent can be present in the polymer coating system in a concentration of less than 10 wt %, or even in a concentration of less than 8 wt %. In some embodiments, water or solvent can be present in the polymer coating system in a concentration of less than 6 wt %, or even in a concentration of less than 4 wt %.

In some embodiments, the pre-polymeric material can be selected so that when the polymer coating system is cured, a thermoset polymer is formed, thereby reducing creep and shifting of the polymeric filler material. Exemplary polymer coating systems include, but are not limited to, 2-part epoxies, 2-part urethanes, 2-part acrylics, 2-part silicones, moisture cure urethanes or epoxies, phenolics, novolacs, urea formaldehyde, melamine formaldehyde, crosslinking acrylics or vinyls, alkyds, unsaturated polyesters, polyimides, and polyamides.

In some embodiments, the pre-polymeric material is photo- or electron-beam-curable. The photo or electron beam curable pre-polymers can be selected from free radical addition polymerizable pre-polymers, such as acrylates; free radical step growth polymerizable pre-polymers, such as thiol-ene; and cationic addition polymerizable pre-polymers, such as epoxy homopolymers. Mixtures of the above chemistries can also be used in the photo or electron beam curable pre-polymers.

The photo or electron beam curable pre-polymer system can be applied to the recess 301 of the laminated glass sheet 100 when the pre-polymer is in the phase of a liquid, paste or gel. Thus, in some embodiments, the photo or electron beam curable pre-polymer system can be applied by roll coating or by application with a sponge, needle dispense, spray, dip, ink jet, brush, or blade. After the electron beam or photo-curable pre-polymer system is applied to the recess of the laminated glass sheet, the electron beam or photo curable pre-polymer can be polymerized and cured, such as by being exposed to a form of energy that causes the pre-polymer to polymerize and cure, thereby forming a protective barrier over the exposed portion of the glass core layer. The electron beam or photo curable pre-polymer can be cured by any conventional electron beam or photo curing apparatus. When cured (i.e., in a solid state) in the recess of the laminated glass sheet, the electron beam or photo curable polymer can have the same or nearly the same volume as it did in its liquid, paste or gel phase, or can experience noticeable shrinkage in its cured state. Thus, multiple applications of the electron beam or photo curable pre-polymer and multiple curing steps can not be required, which can reduce processing times and costs.

In some embodiments, the polymeric filler material can be selected based upon the desired use of the laminated glass sheet and the accompanying requirements of the protective edge. For example, for a polymer coating that protects the laminated glass sheet from impact, a urethane-based composition, such as urethane acrylate can be used as the polymeric filler material. In other embodiments an epoxy-based polymeric filler material can be used to help with protection from scratching.

In various embodiments, additives can be added to the polymeric filler material to achieve desired properties of the filler material. For example, the polymeric filler material can comprise silica, alumina, quartz, cristobalite, or the like to improve impact resistance. In some embodiments, polymeric filler materials comprise adhesion promoters, such as silanes, zirconates, titanates, and acid-functional materials. The additives in the polymeric filler material can be present as nano-sized additives to promote clarity at high additive load levels.

In some embodiments, the filler material is a glass frit which can be inserted into the recess formed by removing the glass core layer. The glass frit can be inserted into the recess by any suitable process. The size of the glass frit is not limited so long as the glass frit is of a size that allows it to enter the recess. After the glass frit is inserted into the recess, the glass frit can be melted by a laser to seal the glass core layer at the recess. The composition of the glass frit is not particularly limited and it can be the same as or different from the composition of the glass core layer or the clad layers.

Figure 5:
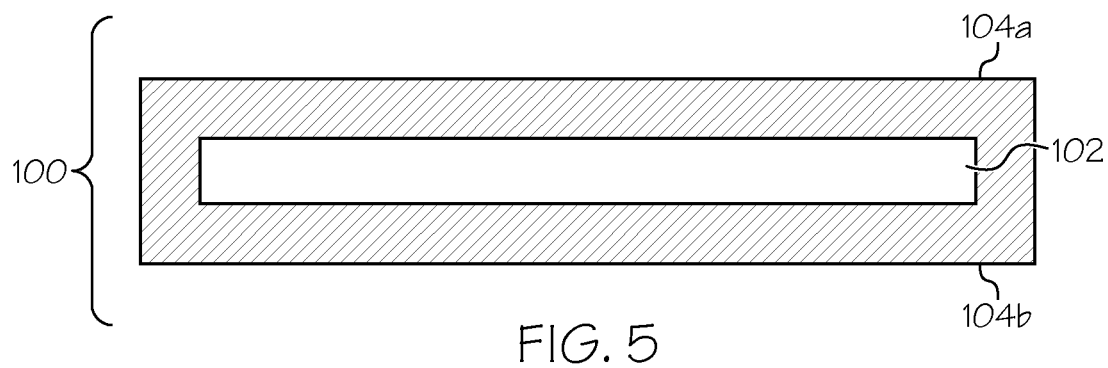
FIG. 5 schematically depicts a cross section of a laminated glass structure after etching with its recesses filled with the clad layers as the filler material.

FIG. 5 schematically depicts a laminated glass sheet 100 where the recess has been filled with the one or more of the clad layers 104a, 104b. As shown in FIG. 3, a recess 301 is formed between clad layers 104a and 104b by removing a portion of the glass core layer. This results in portions of the clad layers 104a, 104b protruding beyond or over the recess 301 (hereinafter referred to as "protrusions"). In some embodiments, the filler material that fills recess 301 can be formed by manipulating the protrusions into the recess 301.

In some embodiments, after a portion of the glass core layer 102 is removed to form the recess 301, the protrusions can be heated, such as by a flame from, for example, an oxy torch, or laser beam, to a temperature that melts the surface of the protrusions and makes them pliable. The pliable protrusions can then be manipulated into the recess by, for example, gravity or mechanical means. Once the protrusions are manipulated into the recess, the heated material is allowed to solidify by cooling at ambient temperatures. Additional fire-polishing steps can be conducted to smooth the edge surface of the laminated glass sheet.

Although FIG. 4 and FIG. 5 show both recesses filled with the polymeric filler material or the clad layer filler material, respectively, in some embodiments only one recess of the laminated glass sheet might be filled with the filler material. Furthermore, recesses can not be formed on certain edges of the laminated glass sheet, or filler material need not be inserted into recesses formed on certain edges of the laminated glass sheet. For example, where the end use of the laminated glass sheet is in a device that requires the recess of the laminated glass sheet to remain accessible in order for the laminated glass sheet to fit into the device, the recess can need not be filled with a filler material.

The glass articles described herein can be used for a variety of applications including, for example, for cover glass or glass backplane applications in consumer or commercial electronic devices including, for example, LCD, LED, OLED, and quantum dot displays, computer monitors, sound bars, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications including, for example, windows, lighting, instruments, and helmet visors; for commercial or household appliance applications; for lighting or signage (e.g., static or dynamic signage) applications; for transportation applications including, for example, rail and aerospace applications; or for antimicrobial applications.

A variety of products can incorporate the glass articles described herein. In some embodiments, an electronic device (e.g., a consumer or commercial electronic device) such as, for example, a LCD, LED, OLED, or quantum dot display comprises one or more of the glass articles, which can be deployed as a cover glass, or as a glass backplane. In some embodiments, an integrated circuit such as, for example, a semiconductor wafer, comprises one or more of the glass articles. In some embodiments, a photovoltaic cell comprises one or more of the glass articles. In some embodiments, an architectural pane comprises one or more of the glass articles. In some embodiments, a vehicular member or component such as, for example, a glazing or window, a light, or an instrument comprises one or more of the glass articles. In some embodiments, a helmet visor comprises one or more of the glass articles. In some embodiments, an appliance (e.g., a household, or commercial appliance) comprises one or more of the glass articles. In some embodiments, a light or a sign comprises one or more of the glass articles.

Example

Embodiments will be further clarified by the following example.

A glass sheet suitable for use as a glass core layer was produced with the composition outlined in Table 1 below:

TABLE 1

| Component | Amount (wt %) |
|---|---|
| $SiO_2$ | 49 |
| $Al_2O_3$ | 28 |
| $B_2O_3$ | 5 |
| $Na_2O$ | 17 |
| $K_2O$ | 1 |

The glass sheet with the composition outlined above was etched with four etchants comprising HF or a mixture of HF and HCl, as shown in Table 2 below. The etch rate for each of the four etchants is also shown in Table 2 below.

TABLE 2

| HF (vol %) | HCl (vol %) | Etch Rate (μm/min) |
|---|---|---|
| 5.00 | 0.00 | 3.30 |
| 5.00 | 5.00 | 3.58 |
| 5.00 | 12.50 | 3.83 |
| 5.00 | 25.00 | 3.90 |

In addition to the four etchants as shown in Table 2, four etchants comprising various amounts of HF and $HNO_3$ were also used on the glass core sheet composition shown in Table 1. These etchants and the etch rate are shown in Table 3 below.

TABLE 3

| HF (vol %) | $HNO_3$ (vol %) | Etch Rate (μm/min) |
|---|---|---|
| 5 | 3.8 | 3.52 |
| 5 | 9.4 | 3.47 |
| 5 | 18.8 | 3.59 |

A glass sheet suitable for use as a glass clad layer was produced with the composition outlined in Table 4 below.

TABLE 4

| Component | Amount (wt %) |
|---|---|
| $SiO_2$ | 66 |
| $Al_2O_3$ | 14 |
| $Na_2O$ | 13 |
| $K_2O$ | 2 |
| CaO | 1 |
| MgO | 4 |

The glass sheet with the composition outlined in Table 4 above was etched with four etchants comprising HF or a mixture of HF and HCl, as shown in Table 5 below. The etch rate for each of the four etchants is also shown in Table 5.

TABLE 5

| HF (vol %) | HCl (vol %) | Etch Rate (μm/min) |
|---|---|---|
| 5.00 | 0.00 | 0.44 |
| 5.00 | 5.00 | 0.48 |
| 5.00 | 12.50 | 0.66 |
| 5.00 | 25.00 | 0.91 |

In addition to the four etchants as shown in Table 5, four etchants comprising various amounts of HF and $HNO_3$ were also used on the glass clad sheet composition shown in Table 4. These etchants and the etch rate are shown in Table 6 below.

TABLE 6

| HF (vol %) | HNO3 (vol %) | Etch Rate (μm/min) |
| --- | --- | --- |
| 5 | 3.8 | 0.50 |
| 5 | 9.4 | 0.58 |
| 5 | 18.8 | 0.77 |
| 5 | 38.0 | 1.17 |

As the etch rates shown in Tables 2, 3, 5, and 6 confirm, the glass composition provided in Table 1 has an etch rate that is much higher than for the glass composition provided in Table 4. In one set of embodiments, the glass composition provided in Table 1 is suitable for use as a glass core layer and the glass composition provided in Table 4 is suitable for use as corresponding clad layers in a laminated glass sheet.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of manufacturing a laminated glass article comprising a glass first clad layer, a glass second clad layer, a glass core layer between the first clad layer and the second clad layer, and an edge, each of the first clad layer and the second clad layer fused to the core layer, the method comprising:
   applying an etchant to the edge of the laminated glass article, the core layer exposed at the edge;
   forming a recess in the edge of the laminated glass article by removing at least a portion of the core layer with the etchant, wherein the recess spans between the first clad layer and the second clad layer; and
   filling the recess with a polymer filler material.

2. The method of claim 1, wherein the etchant etches the core layer faster than the first clad layer and the second clad layer.

3. The method of claim 1, wherein the core layer is at least about 5 times more soluble in the etchant than the first clad layer and the second clad layer.

4. The method of claim 1, wherein a thickness of the laminated glass article is about 4 mm or less and a thickness of each of the first clad layer and the second clad layer is from about 10 μm to about 200 μm.

5. The method of claim 1, wherein the core layer has a coefficient of thermal expansion the same as or higher than a coefficient of thermal expansion of each of the first clad layer and the second clad layer.

6. The method of claim 1, wherein an etch rate of the first clad layer and the second clad layer is from about 0.10 μm/min to about 1.00 μm/min, and an etch rate of the core layer is from about 2.00 μm/min to about 5.00 μm/min.

7. The method of claim 1, wherein the etchant comprises hydrofluoric acid, hydrochloric acid, nitric acid, sulfuric acid, phosphoric acid, ammonium bifluoride, or mixtures thereof.

8. The method of claim 1, wherein the polymer filler material comprises a polymer selected from the group consisting of 2-part epoxies, 2-part urethanes, 2-part acrylics, 2-part silicones, moisture-cure urethanes, moisture-cure epoxies, phenolics, novolacs, urea formaldehyde, melamine formaldehyde, crosslinking acrylics, crosslinking vinyls, alkyds, unsaturated polyesters, polyimides, and polyamides.

9. The method of claim 1, wherein the filling step comprises:
   applying a liquid pre-polymeric material to the at least one edge of the laminated glass article; and
   curing the liquid pre-polymeric material to form a protective polymeric layer.

10. The method of claim 9, wherein the curing step comprises photo curing or electron beam curing.

11. The method of claim 9, wherein the pre-polymeric material is a material selected from the group consisting of a free radical addition polymerizable pre-polymeric material, a free radical step growth polymerizable pre-polymeric material, and a cationic addition polymerizable pre-polymeric material.

12. The method of claim 9, wherein the pre-polymeric material comprises at least one additive selected from the group consisting of silica, alumina, quartz, cristobalite, silanes, zirconates, titanates, and acid functional materials.

* * * * *